June 2, 1931. C. A. MARTIN 1,808,241
SYSTEM OF HEAT TREATING
Filed Oct. 3, 1925 3 Sheets-Sheet 1

Inventor
Charles A. Martin

June 2, 1931. C. A. MARTIN 1,808,241
SYSTEM OF HEAT TREATING
Filed Oct. 3, 1925 3 Sheets-Sheet 2

Inventor.
Charles A. Martin.

June 2, 1931.  C. A. MARTIN  1,808,241
SYSTEM OF HEAT TREATING
Filed Oct. 3, 1925   3 Sheets-Sheet 3

Inventor
Charles A. Martin.

Patented June 2, 1931

1,808,241

UNITED STATES PATENT OFFICE

CHARLES A. MARTIN, OF CHICAGO, ILLINOIS

SYSTEM OF HEAT TREATING

Application filed October 3, 1925. Serial No. 60,316.

My invention relates to improved means for detecting a change in the permeability of a magnetic substance which is of use in connection with the treatment of such a substance under a change of temperature. The measurement of the permeability may be made use of to determine whether or not the desired treatment of the substance or material has been obtained, or to control such treatment in a manner predetermined.

The use of a system of this character is of particular utility for instance when a piece of magnetic material, such as iron or steel, is in a furnace subject to great heat. It is well known, of course, that the permeability, that is, the magnetic permeability of a magnetic substance has definite values in accordance with the temperature of the material.

The invention is also of use in all types of furnaces for controlling the application of heat, or for controlling the speed of travel of the material through a furnace in those cases where a continuous movement of the material through the furnace takes place.
The speed of travel can be controlled, for instance, or the heat application may be controlled, or the cooling action may be controlled, so that the change in permeability of the material takes place at a certain point in the furnace.

Heretofore, means have been employed to measure the permeability of a magnetic substance when under the influence of heat, but these means have contemplated the use of a magnetic substance placed in juxtaposition to the substance or material being treated so that inaccuracies were likely to occur due to a change of magnetic characteristics of the material which was being used in the attempt to measure the permeability of the material being treated.

In the specification and also in the claims I use the words "heat-treated" as signifying the treatment of a material either by the application of heat or the treatment of the material by permitting it to cool at a certain rate.

The system which forms the subject matter of this invention is an improvement over the systems of the prior art in that means are provided (within certain practical limits) which are substantially unaffected by the temperature in the furnace and which means are available to measure the permeability of the substance being treated.

In one form of the invention I also use magnetic material for indicating or measuring the permeability and in that particular form of the invention, I provide means for cooling this magnetic material which is used for detecting purposes in such a way as to render it unaffected (within the practical limits of error) by the heat in the furnace. I then utilize auxiliary apparatus responsive to the permeability indicating or measuring mechanism, which auxiliary apparatus may control automatically the application of heat or the speed of travel of the substance through the furnace or which may control any other function which it is desired to conrol in accordance with the indications of the permeability measuring mechanism.

I will describe several forms which my invention may take by referring to the accompanying drawings, in which

Figure 1:
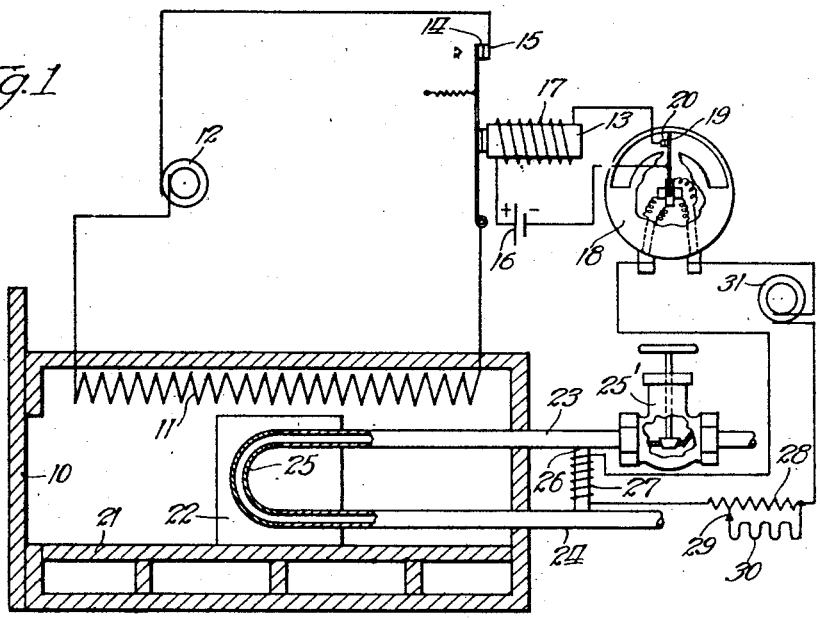
Fig. 1 is a diagrammatic view of a system constructed in accordance with my invention, certain parts being shown in section.

By referring more particularly to Fig. 1, I show a furnace 10, which furnace is provided with a heating coil 11 adapted to supply heat to the furnace. This coil receives its current from a suitable source 12, the application of current from said source being controlled by the relay 13 and its pair of contacts 14, 15. This relay is energized by means of a battery 16 serially included with the windings 17 of said relay, this circuit being controlled by the measuring instrument 18 through the agency of a contact provided upon a pointer 19 and a co-operating contact 20. A suitable floor 21 is provided within the furnace 10 upon which a suitable block 22 of material which is to be heat-treated may be placed.

My improved means for measuring the permeability of the block 22 consists of a pair of pipes 23 and 24 made of magnetic material which are joined at their left hand extremity by an elbow 25 made of non-magnetic material but joined to the pipes 23 and 24 in such a way as to provide a path for the circulation of cooling fluid through the said pipes 23 and 24. A valve 25' is interposed in one of the pipes to control the flow of cooling liquid or fluid so as to regulate the temperature of the pipes 23 and 24. The pipes 23 and 24 are suitably joined by a keeper 26 of magnetic material which carries a coil 27. The magnetic circuit thus extends from one extremity of the keeper 26 through the pipe 23, the material 22 which is being heat-treated, the pipe 24, to the opposite extremity of the keeper 26 and hence through said keeper. Alternating current is impressed upon the circuit including the coil 27 and this may be obtained from any suitable source such as the source 31. The amount of current traversing through the coil 27 depends of course upon the magnetic permeability of the magnetic circuit magnetically associated with said coil. As the permeability of the elements 23, 24, and 26 remains the same due to their remaining at the same temperature regardless of the temperature of the furnace, the only element of this magnetic circuit which can influence the flow of current traversing the coil 27 is the magnetic block 22, this block 22 changing its magnetic permeability due to a change in temperature. The current traversing the coil 27 therefore can be used as a gauge to determine the magnetic permeability of the block 22 and hence of the temperature of the block 22. The measuring instrument 18 is included in the circuit of the source 31 and the coil 27 and in this same circuit there is also included a resistance 28 whose effective value is controlled by the adjustment of the contact 29 which forms the terminal of a flexible conductor 30. The flow of current through the coil 27 is initially adjusted by adjusting the effective value of the resistance 28 in such a manner that the pointer 19 of the measuring instrument 18 is just in contact with the contact 20, while the substance 22 is being heated, this gradual heating of the substance 22 taking place while such substance is below the temperature at which a sudden change in its permeability takes place. This sudden change in the permeability usually takes place at a rather high value of temperature. When the substance 22 is heated to a temperature at which the permeability changes rapidly, so that the substance 22 is less permeable, then the flow of current through the coil 27 increases sufficiently to cause the pointer 19 to move in a clockwise direction and break the circuit with its contact 20. With a constant source of alternating potential (31) and a definite adjustment of the resistance 28, the flow of the current through the coil 27 will be constant only when the permeability of the substance completing the magnetic circuit is constant, resulting in a magnetic circuit having a constant magnetic reluctance.

While the substance 22 is being heat-treated, and before its permeability changes abruptly, due to its having reached a certain temperature, contact between the elements 19 and 20 remains completed, thus maintaining energization of the relay 13 to keep the contacts 14 and 15 in engagement. After the permeability of the substance 22 changes abruptly, the self-inductance of the coil 27 decreases and the flow of the current through the measuring instrument 18 is increased, thus to break the circuit between the elements 19 and 20, and to thereupon break the circuit between the elements 14 and 15. When desirable, the automatic control of current through the coil 11 may be omitted as the operator can ascertain from the indications of the measuring instrument 18 when the desired heat-treatment of the substance 22 has taken place.

Figure 2:
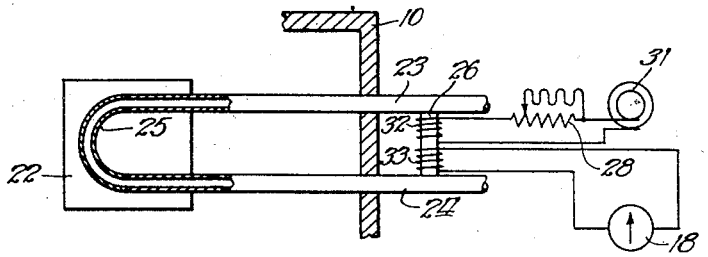
Fig. 2 is a fragmentary view of a portion of the apparatus shown in Fig. 1 but illustrating diagrammatically a modification of the electrical portion thereof.

Fig. 2 shows a modified form of translating the permeability of a magnetic circuit consisting of the elements 22, 23, 24 and 26, in that a coil 32 is included in closed circuit with the resistance 28 and the source of alternating potential 31. A second coil 33 is provided which is directly associated with the measuring instrument 18. The change in the permeability of the material 22 causes a change in the mutual inductance between the coils 32 and 33, thus to affect the measuring instrument 18.

Figure 3:
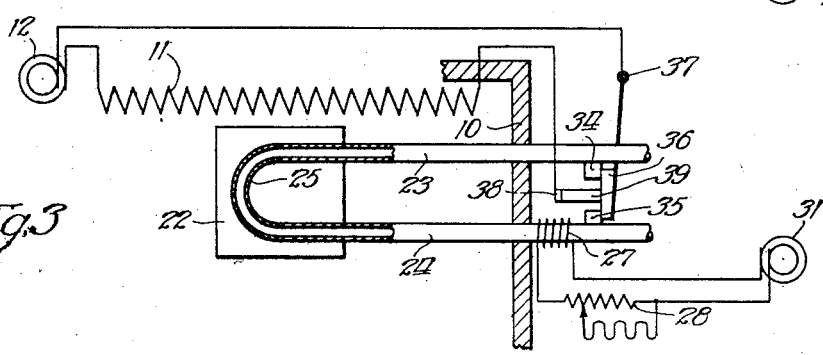
Fig. 3 is a fragmentary view more or less similar to that of Fig. 2 illustrating a change in the magnetic characteristics of the permeability measuring apparatus.

In Fig. 3, I have illustrated a further modified form of using the change in permeability to effect circuit control in that I have provided the pipes 23 and 24 with pole pieces 34 and 35, which co-operate with an armature 36 pivotally suspended from the pivot 37. The coil 27 in this case is preferably wrapped about the leg or pipe 24, thus to energize the magnetic circuit and this energization is sufficient during the heating of the substance 22 to retain the armature 36 against the pole pieces 34 and 35. When the reluctance of the magnetic circuit decreases due to a sudden change in the permeability of the substance 22, then the armature 36 falls back due to gravity, thus to open the circuit between the contacts 38 and 39 controlled thereby, thus effecting a control of the heating element 11.

Figure 4:
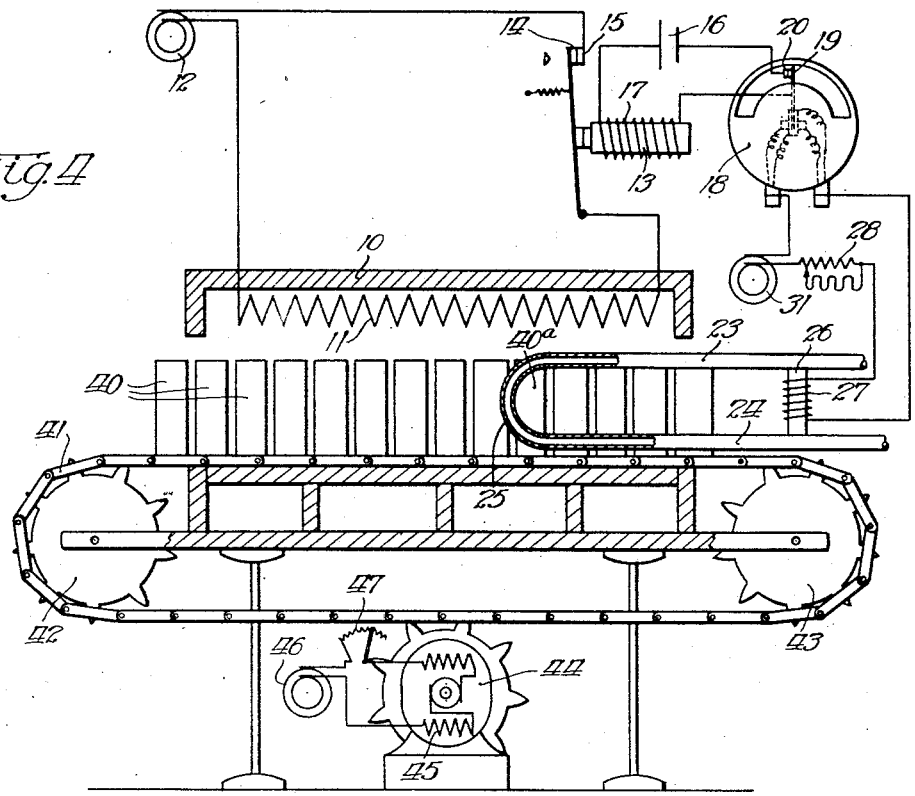
Fig. 4 is a diagrammatic view partly in section illustrating a continuously operating furnace to which my invention as illustrated in Fig. 1 is applied;

In Fig. 4, I show means whereby my invention is applied to a continuous type of furnace so that the furnace can be controlled to have the substance being heat-treated change its permeability, i. e. arrive at a certain temperature at any given point in its travel through the furnace. The furnace, together with the parts which are responsive to the permeability and the parts which control the circuit through the coil 11 are the same as those illustrated in Fig. 1. In this instance, however, I provide a plurality of pieces of material to be heat treated, that is, the pieces 40. These are placed upon a conveying chain 41 which is suitably driven by means of sprocket wheels 42 and 43, the chain itself being driven by the motor 44. This motor has a speed regulating coil 45 which is supplied with current from the source of current 46 and which through the interposition of the switch 47 may have its speed controlled, if desired, to regulate the speed of the pieces 40 through the furnace. The parts 23, 24 and 25 are placed in the furnace at the point corresponding to where it is desired to have the sudden change in permeability take place, and we may assume that this should be the piece 40a which is directly opposite the elbow 25. If the change in permeability of the piece 40a has not taken place when it reaches that particular spot, then the contacts 14 and 15 remain closed and thus cause increased heating effect within the furnace. If on the contrary this change in permeability has taken place prior to the time that the piece 40a reaches the position shown in Fig. 4, then the contacts 14 and 15 are opened when that piece reaches that particular position, thus to decrease the gradual heating effect of the furnace. In this way a balance is presently obtained so that the desired heating effect is secured and the proper degree of temperature reached just as the piece 40a assumes the position indicated in the figure. The contacts 14 and 15 may of course in addition regulate the circuit of the motor 44 so as to change the speed of the moving pieces 40 instead of changing the heating effect of the furnace.

Figure 5:
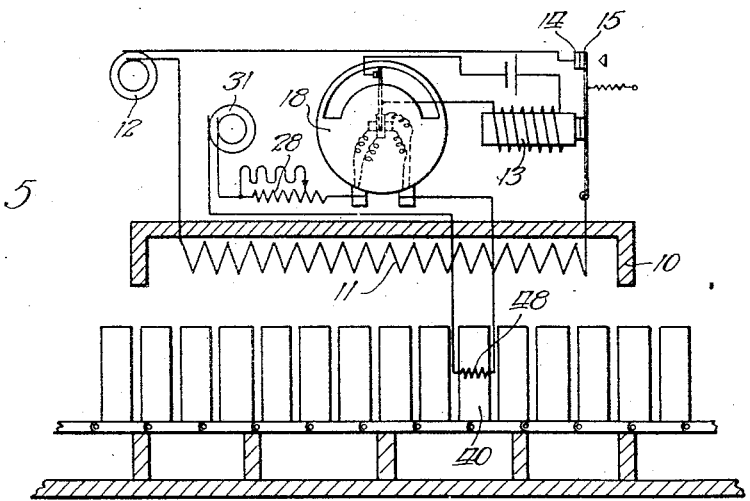
Fig. 5 is a view similar to that of Fig. 4 illustrating a modified form of detector used in connection with the measurement of the permeability.

In Fig. 5, I have shown the parts the same as they are shown in Fig. 4 with the exception that the means for detecting the permeability and which are included in circuit with the measuring instrument 18 have been changed in that I utilize a coil 48 which is supplied with current the same as current is supplied to the coil 27, but in which the only circuit of magnetic material for said coil consists of the piece 40 which is being heat-treated. Being in close proximity to the coil 48, the permeability of this piece 40 controls the amount of current flowing through the coil 48, thus to control the actuations of the measuring instrument 18, the same as heretofore explained in connection with the other figures. The indications in this particular instance are also uninfluenced by heat because the change of resistance of the wire composing the coil 48 is negligible for the purposes for which this device is intended. It is of course obvious that it is not necessary to entirely disconnect the coil 11 from its source of current 12 through the agency of the contacts 14 and 15, but these contacts can effect any suitable control of said heating element as may be desired.

Figure 6:
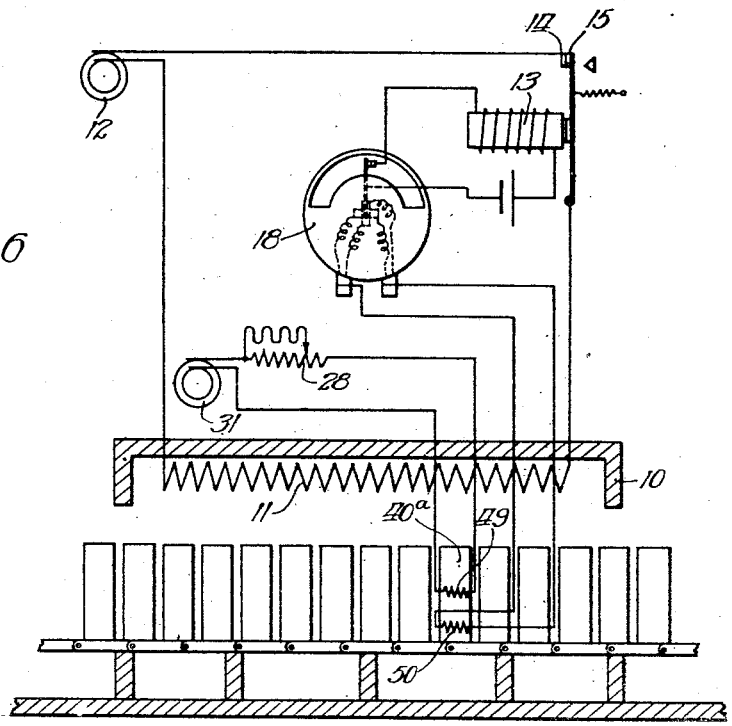
Fig. 6 is a diagrammatic view partly in section showing a modified form of the detecting apparatus as illustrated in Fig. 5.

In Fig. 6, I show a modified form of the coil arrangement of Fig. 5 in that the coil 48 of Fig. 5, which is in series with both the measuring instrument 18 and the resistance 28, is divided so that there are two coils 49 and 50, these coils being so arranged that there is mutual inductance between them and this mutual inductance depends upon the permeability of the piece 40a which is in close proximity to the coils 49 and 50. The coil 50 is in series with the measuring instrument 18 and the coil 49 is in series with the resistance 28 and the source of current 31. This arrangement is similar in many respects to that shown in Fig. 2.

Figure 7:
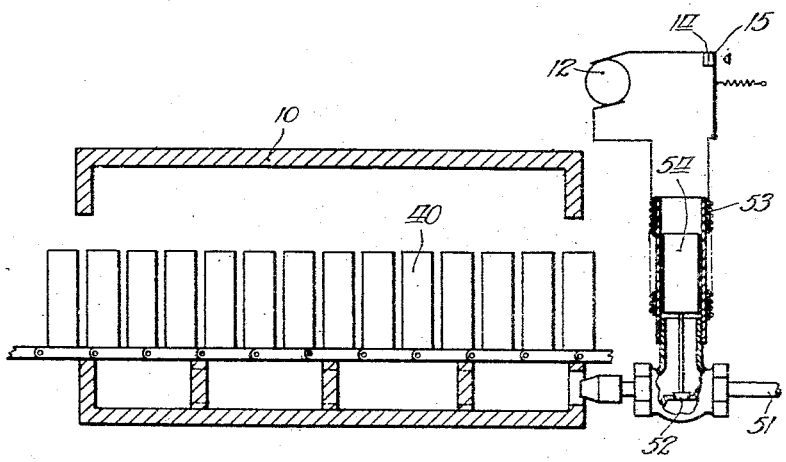
Fig. 7 is a diagrammatic view partly in section illustrating different means for control of the heat generated in the furnace.

In Fig. 7, I show an arrangement similar to that heretofore illustrated except that instead of using a heating coil 11, I use a source of liquid or gaseous fuel which enters through the pipe 51 suitably controlled by a valve 52, which valve is controlled by the solenoid 53 and plunger 54, this solenoid having its circuit controlled by the contacts 14 and 15, the same as heretofore explained in connection with the other figures. Thus more or less fuel is admitted to increase or decrease the heating effect in the same manner that more or less current may be supplied to the coil 11 as in the illustrations of Figs. 1 to 6 inclusive.

From what has been thus described the nature of my invention will be clear to those skilled in the art and it will also be apparent that many modifications may be made within the scope of the appended claims without departing from the spirit of my invention.

Having thus described my invention what I desire to claim and secure by United States Letters Patent is:

1. A system of heat treating a magnetic substance comprising means responsive to a change in the magnetic permeability of the substance, means for cooling said permeability responsive means, and means controlled by said permeability responsive means for indicating the changes in said means due to a change in the permeability.

2. A system of heat treating a magnetic substance comprising means responsive to the magnetic permeability of the substance, means for cooling said permeability responsive means, means for supplying heat for treating said substance, and means for controlling said heat supplying means through the agency of said permeability responsive means.

3. A system of heat treating magnetic articles comprising means responsive to a change in the magnetic permeability of said articles, means for cooling said permeability responsive means, a furnace, means for continuously conveying articles to be heat treated through said furnace, and means controlled by said permeability responsive means for controlling the heating effect of said furnace.

4. A system of heat treating magnetic articles comprising means responsive to a change in the magnetic permeability of said articles, a furnace, means for continuously conveying said articles through said furnace, and means controlled by said permeability responsive means for indicating the degree of the permeability of the articles at any pre-determined point in their travel through said furnace.

5. A system of heat treating magnetic articles comprising means responsive to a change in the magnetic permeability of said articles, a furnace, means for continuously conveying the articles through said furnace, and means controlled by said permeability responsive means and the permeability of the articles at a predetermined point in the furnace for automatically controlling the heat input to the articles passing through said furnace.

In witness whereof, I hereunto subscribe my name this 24th day of September, A. D. 1925.

CHARLES A. MARTIN.